United States Patent
Ye

(10) Patent No.: US 7,508,642 B2
(45) Date of Patent: Mar. 24, 2009

(54) METHOD AND APPARATUS APPLYING VIRTUAL ΔT TRIP CRITERION IN POWER DISTRIBUTION

(75) Inventor: Yang Ye, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 309 days.

(21) Appl. No.: 11/480,450

(22) Filed: Jul. 5, 2006

(65) Prior Publication Data
US 2007/0014066 A1 Jan. 18, 2007

Related U.S. Application Data

(60) Provisional application No. 60/698,925, filed on Jul. 14, 2005.

(51) Int. Cl.
H02H 5/04 (2006.01)
G06G 7/56 (2006.01)

(52) U.S. Cl. .................. 361/103; 361/93.2; 702/132; 703/5

(58) Field of Classification Search ............. 361/103, 361/93.2; 702/132; 703/5
See application file for complete search history.

(56) References Cited

U.S. PATENT DOCUMENTS

| 3,289,478 A | 12/1966 | Shinichi et al. |
| 4,740,883 A | 4/1988 | McCollum |
| 4,775,245 A | 10/1988 | Hagerman et al. |
| 5,497,072 A | 3/1996 | LeComte et al. |
| 5,723,915 A | 3/1998 | Maher et al. |
| 5,854,731 A * | 12/1998 | Thomas ............. 361/93.8 |
| 6,125,024 A | 9/2000 | LeComte et al. |
| 6,563,685 B2 | 5/2003 | Gotzig |
| 7,239,496 B2 * | 7/2007 | Schweitzer et al. ....... 361/103 |
| 2003/0095367 A1 | 5/2003 | Mares et al. |
| 2005/0047043 A1 | 3/2005 | Schweitzer, III et al. |
| 2005/0052808 A1 | 3/2005 | Nguyen |

FOREIGN PATENT DOCUMENTS

| DE | 19835485 A1 | 2/2000 |
| DE | 10053007 A1 | 5/2001 |
| DE | 10257425 A1 | 6/2004 |
| EP | 0600751 A2 | 12/1993 |
| WO | 9704511 A | 2/1997 |

OTHER PUBLICATIONS

Pitts et al., Theory and Problems of Heat Transfer, 1997, Schaum's Outline Series, McGraw-Hill, pp. 1-4, 18, 19.*
European Search Report dated Mar. 20, 2008.

* cited by examiner

Primary Examiner—Stephen W Jackson
Assistant Examiner—Zeev Kitov
(74) Attorney, Agent, or Firm—Oral Caglar, Esq.

(57) ABSTRACT

A virtual ΔT trip criterion is implemented in an electrical power distribution system to provide current-based tripping for a solid state power switching device. A first-order system model is implemented either by hardware or software to represent a rise in temperature of the electrical wire through which power is supplied. When the simulated temperature exceeds a threshold, the solid state power switching device may be tripped.

13 Claims, 12 Drawing Sheets

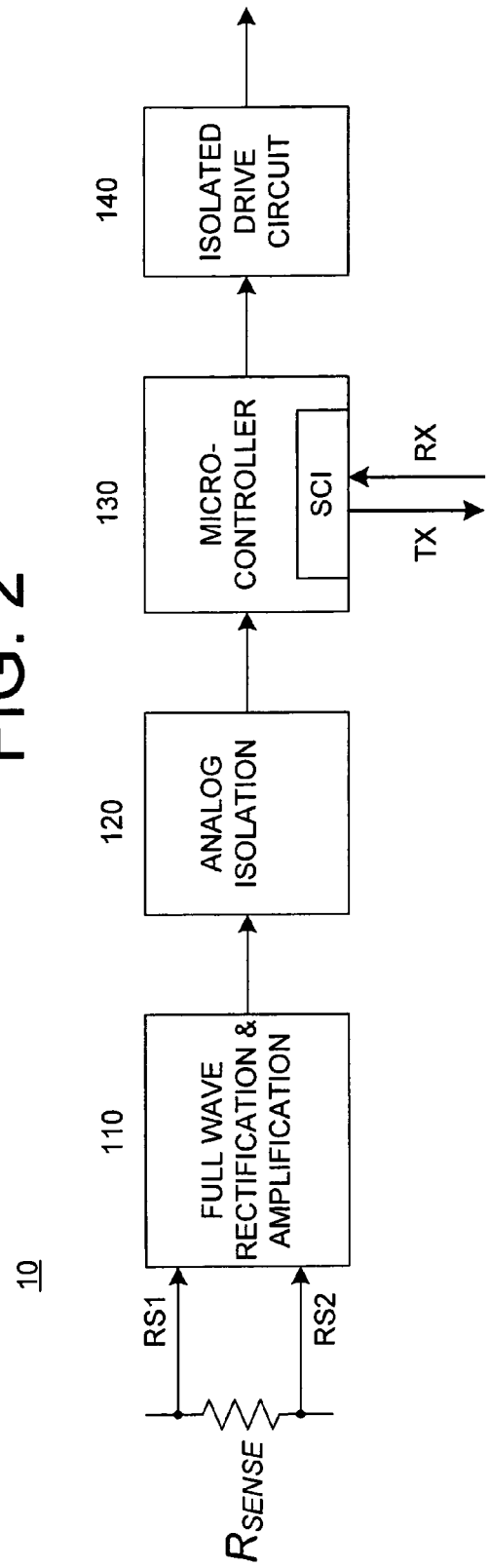

METHOD AND APPARATUS APPLYING VIRTUAL ΔT TRIP CRITERION IN POWER DISTRIBUTION

CROSS-REFERENCES TO RELATED APPLICATIONS

This non-provisional application claims priority under 35 U.S.C. § 119(e) on U.S. Provisional Application No. 60/698,925 filed on Jul. 14, 2005, the entire contents of which are hereby incorporated by reference.

FIELD OF THE INVENTION

The present invention relates to electrical power distribution, and more particularly to a method and apparatus applying a virtual ΔT trip criterion to control power distribution.

BACKGROUND

The solid state power controller (SSPC) is a solid state device that has been relied upon to replace the traditional circuit breaker in certain applications, including aircraft electrical power distribution. It is desired for SSPC to have the same trip curve as the circuit breaker. However, the most commonly used trip criterion for SSPC is $I^2t$, which is close to circuit breaker only when the current is much higher than the rated current. The $I^2t$ trip cannot be used independently; instead, it is typically combined with other modifications, like no-trip threshold, thermal memory, etc. Even with all these modifications, it is still difficult to match the trip curve with circuit breaker when current is within 100%~150%.

SUMMARY OF THE INVENTION

Exemplary embodiments of the present invention are directed to the implementation of a virtual ΔT trip criterion for current-based tripping of a solid state power switching device. Specifically, a thermal model is implemented for the electrical wire through which power is supplied by the solid state power switching device. This model represents a first-order system, which may be implemented either by software or hardware. The first order system model simulates a rise in temperature ΔT of the electrical wiring. When ΔT exceeds a threshold, the solid state power switching device may be tripped.

BRIEF DESCRIPTION OF FIGURES

FIG. 2 is a block diagram illustrating a solid state power controller utilizing a software-implementation of the virtual ΔT trip criterion, while

FIG. 7 is a block diagram of a solid state power controller unit utilizing a hardware implementation of the virtual ΔT trip criterion, while

DETAILED DESCRIPTION

Figure 6:
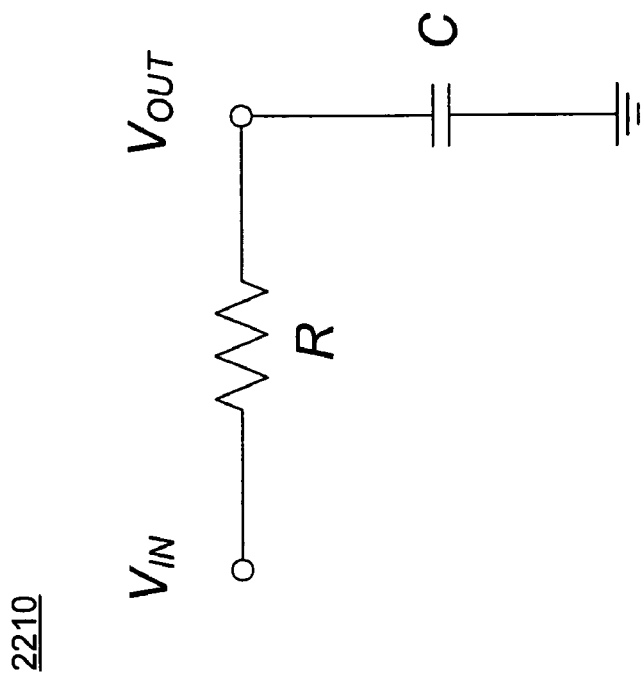
FIG. 6 is an equivalent circuit diagram representing a thermal model for electrical wiring.

In accordance with principles of the present invention, the trip criterion of a Solid State Power Controller (SSPC) is improved through the implementation of a "virtual ΔT" criterion. In one exemplary embodiment, the actual physical process of the temperature rise is modeled, and the temperature rise of the wire under protection is calculated in real time. The switch trip as soon as the temperature rise reaches a preset threshold. Since the model of the physical process is more accurate than the $I^2t$ criterion, the trip curve is much closer to a true circuit breaker trip curve.

According to alternative embodiments, the model may be implemented either through software or hardware. In each embodiment, the model may be implemented as a first-order system. This allows implementation to be relatively straightforward.

Mathematical Principles of Thermal-Electrical Behavior of Electric Wire

An electrical wire heats up when carrying current. The wire temperature will rise accordingly. Once the temperature rises to a critical point, the wire will suffer from thermal damage: melting of the insulation, breaking, or even catching fire. The protection of the wire is to make sure that the wire temperature never exceeds the critical temperature. The relationship between the wire temperature and the current will be explained in more detail below.

For purposes of this description, it is assumed that $T_A$ represents ambient temperature, $T_w$ represents wire temperature, and i represents electrical current flowing through the electrical wire. Further, it is assumed that the rise in temperature (ΔT) may be represented as $\Delta T = T_2 - TA$. Thus, the heat generated from the current in a small period of time is:

$$dQ_{in} = i(t)^2 R \cdot dt \qquad \text{Eq. (1)}$$

where $Q_{in}$ is the generated heat, and R is the wire resistance

The heat is transferred to the environment through three ways: conduction, convection, and radiation. This may be described as $$Q_{out} = Q_{cond} + Q_{conv} + Q_{rad} \qquad \text{Eq. (2)}$$

where $Q_{out}$ is the total heat transferred to the environment, $Q_{cond}$ is the heat transferred through conduction, $Q_{conv}$ is the heat transferred through convection, and $Q_{rad}$ is the heat transferred through radiation.

The rate of heat conduction can be described as $$\frac{dQ_{cond}}{dt} = \frac{kA\Delta T}{D} \qquad \text{Eq. (3)}$$

where k is the thermal conductivity of the barrier, A is the contact area, and D is the thickness of the barrier. For the particular case of an electrical wire, k may represent the thermal conductivity of the insulation material, while A represents the perimeter of the wire times the length of the wire, and D represents the thickness of the insulation.

It is difficult to quantify the effect of convection. One way to deal with this situation is to lump the effects of convection in with conduction, i.e., by increasing the value of D. Similarly, the radiation effect can also be lumped together with conduction by further increasing the value of D. If convection and/or radiation is lumped in with conduction, the modified thickness may be represented D' (it should be noted that an alternative method would be to ignore both the effects of convection and radiation, thus making D'=D).

The relationship between energy and temperature is given by the following differential equation:

$$dQ = cm \cdot dT \qquad \text{Eq. (4)}$$

where c is the specific heat of the wire material and m is the mass of the wire. Considering that $Q_{net} = Q_{in} - Q_{out}$, Equations (1)-(4) can be combined to create the following mathematical model:

$$\frac{d}{dt}\Delta T = -\frac{1}{k_1}\Delta T + \frac{1}{k_2}i(t)^2 \qquad \text{Eq. (5)}$$

where $k_1$ and $k_2$ are the following constants:

$$k_1 = \frac{cmD'}{kA}, \text{ and } k_2 = \frac{cm}{R},$$

where R is the resistance of the wire.

Determination of Model Parameters

Determining the values of constants $k_1$ and $k_2$ is a necessary step in order to use mathematical model to protect the electrical wire from dangerous increases in temperature. These $k_1$ and $k_2$ parameters may be obtained either by theoretical derivation, or by experiment.

Theoretical Derivation of $k_1$ and $k_2$:

As discussed above, according to Equation (5), $$k_1 = \frac{cmD'}{kA}, \text{ and } k_2 = \frac{cm}{R}.$$

Thus, to derive the values of $k_1$ and $k_2$ theoretically, the following relationships be used:

$$m = \rho_m V = \rho_m \pi r^2 l, \qquad \text{Eq. (6a)}$$

$$A = 2\pi r l, \qquad \text{Eq. (6b)}$$
and $$R = \rho_r \frac{l}{A_r} = \frac{\rho_r l}{\pi r^2}, \qquad \text{Eq. (6c)}$$

where $\rho_m$ is the density of the wire, V is the volume of the wire, r is the radius of the wire, l is the length of the wire, $\rho_r$ is the resistivity of the wire, and $A_r$ is the section area of the wire.

Thus, by substituting Equations (6a)-(6c) into $k_1$ and $k_2$:

$$k_1 = \frac{c\rho_m rD'}{2k} \qquad \text{Eq. (7a)}$$
and $$k_2 = \frac{c\rho_m \pi^2 r^4}{\rho_r}, \qquad \text{Eq. (7b)}$$

where c is the specific heat of the wire material, $\rho_m$ is the density of the wire, r is the radius of the wire, k is the thermal conductivity of the insulation, $\rho_r$ is the resistivity of the wire, and D' is the thickness of the insulation plus the equivalent thickness of lumping the convection and radiation effect into conduction. According to an exemplary embodiment, D' may determined by estimation and then confirmed by experiment, by methods that will be readily contemplated by those of ordinary skill in the art. However, according to an alternative embodiment, convection and radiation may be ignored by merely plugging in the actual thickness D of the insulation into D'.

Experimental Method to Find $k_1$ and $k_2$:

The parameter $k_1$ represents the cooling time constant of the wire. Thus, $k_1$ can be found by measuring the time it takes for the wire to cool from a higher temperature to a lower temperature.

The parameter $k_2$ determines how fast the wire can be heated up. Based on Equation (5), it is apparent that if the current is high enough, the wire temperature will rise very rapidly. In this case the cooling effect can be ignored. Therefore, the following steps may be used for determining the value of $k_2$:

i) Find the rise in temperature that causes the wire to smoke, record is as $\Delta T_s$;

ii) Give the wire a much higher current than its rating (e.g., 10 times), record the current as $I_s$, and record the time it takes for the wire to smoke as $t_s$; and iii) Plug the recorded parameters ($\Delta T_s$, $I_s$, and $t_s$) into the following equation:

$$k_2 = \frac{I_s^2 t_s}{\Delta T_s}.$$

Steps i) and ii) above may be performed using any methodologies and equipment, as will be contemplated by those of ordinary skill in the art.

Protection Schemes Using Mathematical Model

According to an exemplary embodiment, the first-order system model described in Equation (5) may be used to implement a protection scheme for protecting the wire from excessive heat gains. Such a scheme may be implemented using either a software-based or hardware-based approach.

According to the software approach, Equation (5) may be solved in real time using a microcontroller. The instantaneous value of the current $i_{(n)}$ is sampled by the microcontroller continuously. Thus, Equation (5) is solved using the following calculations, $$d\Delta T_{(n)} = -\frac{1}{k_1}\Delta T_{(n-1)}dt + \frac{1}{k_2}i_{(n)}^2 dt$$
and
$$\Delta T_{(n)} = \Delta T_{(n-1)} + d\Delta T_{(n)},$$

where dt is the sampling period of the microcontroller, and the initial temperature rise ($\Delta T_{(0)}$) is set to $\Delta T_{(0)} = 0$. According to the software approach, the trip criterion is implemented as $\Delta T_{(n)} \geq \Delta T_s$, where $\Delta T_s$ is the preset temperature rise.

Thus, the $\Delta T$ trip criterion in accordance with the above mathematical model may be implemented in a microcontroller-based SSPC. This type of solution is advantageous because it involves a relatively simple algorithm (requiring a short execution time and small amount of memory), provides a precise trip curve, is easily modified, and involves a fast development cycle. The software-based implementation of the ΔT trip criterion will be described in more detail below in connection with FIGS. 2-2B.

Figure 1:
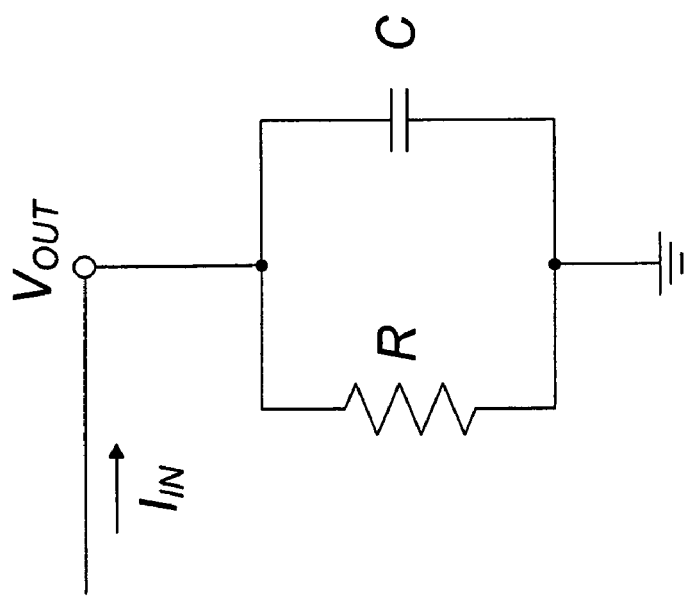
FIG. 1 is an equivalent circuit diagram representing a thermal model for electrical wiring.

According to an alternative embodiment utilizing the hardware approach of implementation, a discrete analog circuit-based SSPC may be configured to implement the ΔT trip criterion. It is possible to take advantage of the fact that Equation (5) may be represented by the process of charging a simple resistor-capacitor (R-C) circuit by application of a current. Such an R-C circuit is illustrated in FIG. 1, in which the following differential equation represents the output voltage $V_{out}$ when current $I_{IN}$ is applied:

$$\frac{d}{dt}V_{OUT} = -\frac{1}{RC}V_{OUT} + \frac{1}{C}I_{IN} \qquad \text{Eq. (8)}$$

The structure of Equation (6) is similar to Equation (5). Specifically, RC is analogous to $k_2$, C is analogous to $k_1$, and $I_{IN}$ is equivalent to $i_{(n)}^2$. Therefore, if R, C, and $I_{IN}$ are chosen correctly, the circuit in FIG. 1 may be used to model the heating and cooling process of an electrical wire by allowing the output voltage $V_{OUT}$ to represent the rise in wire temperature (ΔT).

The use of a discrete analog circuit-based SSPC may provide benefits over the microcontroller approach in reliability. However, it may also have some disadvantages compared to the microcontroller approach including decreased accuracy, less flexibility, and more difficulty in interfacing with the main controller of the power distribution system.

Furthermore, using either the software- or hardware-based approach of implementation, the principles of the present invention may be implemented in an application specific integrated circuit (ASIC) according to an exemplary embodiment. For example, it is contemplated that the design of an existing ASIC used for SSPCs could be modified to implement the principles of the virtual ΔT trip criterion described herein.

Implementation of the Software Approach for an SSPC Unit

According to one exemplary implementation of the software-based approach, PIC16F873A from Microchip® may be selected as the CPU or microcontroller. Of course other microcontroller chips may be used for implementing the present invention. However, merely to facilitate understanding of the present invention, a software-based embodiment of the invention designed for use with the PIC16F873A chip is described below.

The features of the PIC16F873A include:

−55° C.~125° C operational temperature range;
Two internal analog comparators with programmable references and 400 ns response time;
Internal 5-channel 10-bit A/D converter with 16 μs of conversion time;
One 16-bit timer and two 8-bit timers;
8K 14-bit word flash program memory;
368 bytes data memory;
256 bytes EEPROM;
Integrated communication protocols: SCI, I²C, and SPI;
In circuit serial programming capability;
Frequency of up to 20 MHz with crystal, or 4 MHz with external RC circuit; and
28-pin Dual-In-Line or SOIC package.

Figure 2A:
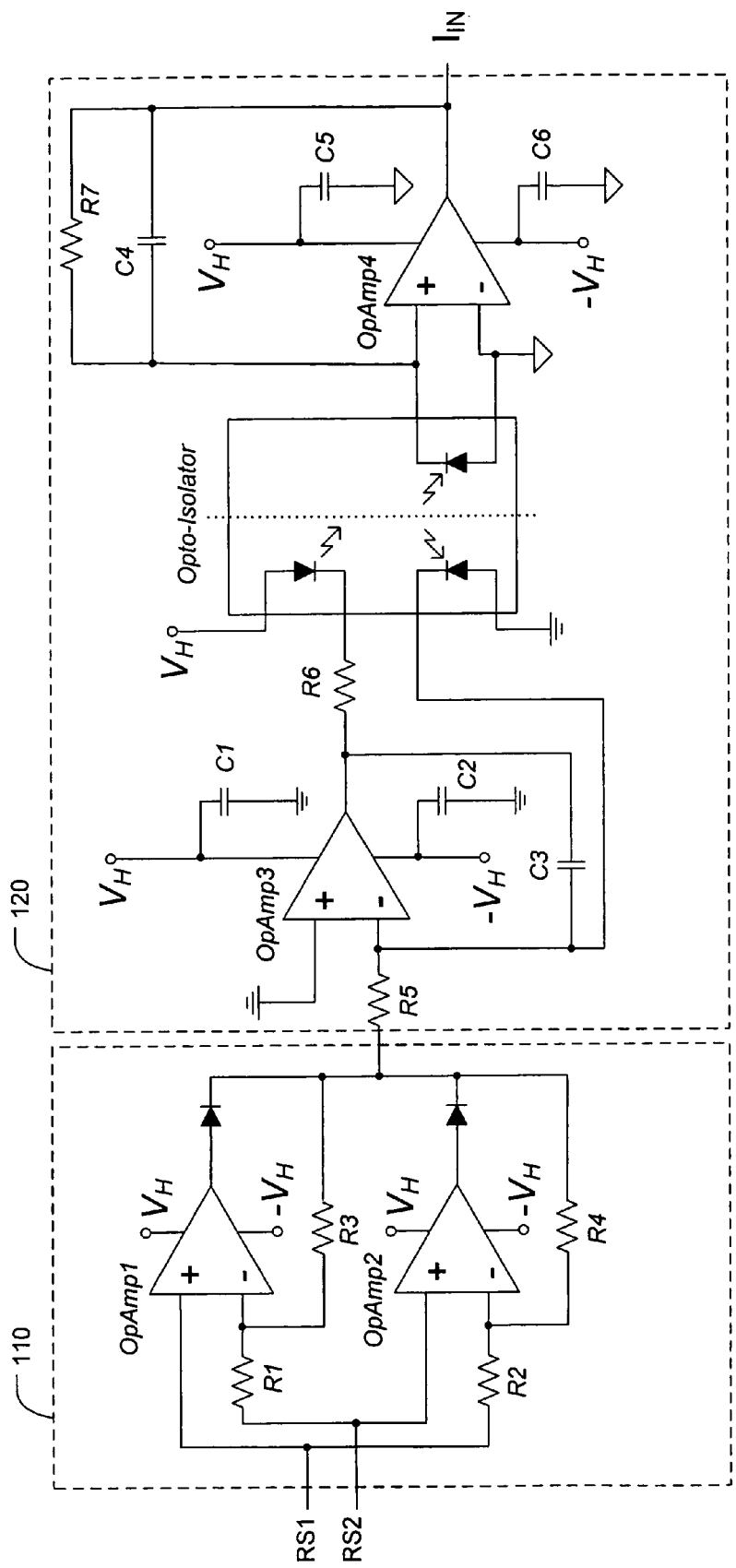
FIGS. 2A and 2B are schematics illustrating components thereof, in accordance with an embodiment of the present invention.
Figure 2B:
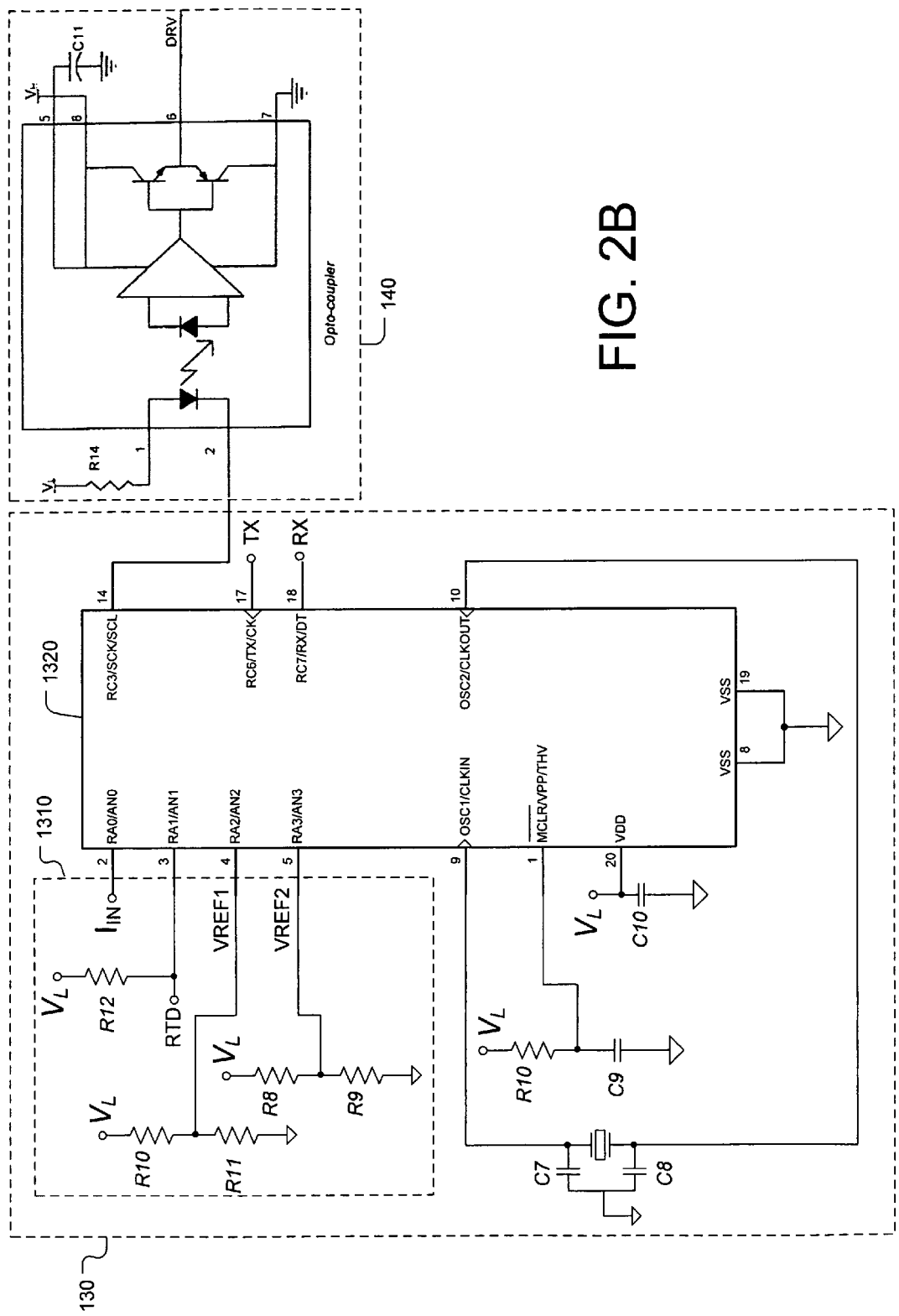

FIG. 2 is a block diagram illustrating an SSPC unit 10 utilizing the software-implementation of the virtual ΔT trip criterion. FIGS. 2A and 2B are schematics illustrating components thereof, in accordance with exemplary embodiments. It should be noted that the SSPC 10 will include other components and circuitry not shown in these figures or described below, illustration/description of which is not required for an understanding of this invention.

FIG. 2 illustrates that the electrical current may be sensed from a sense resistor $R_{SENSE}$ via input terminals RS1 and RS2. In FIG. 2, the sensed current is input by a full wave rectification and amplification circuit 110. The SSPC 10 also includes an analog isolation circuit 120 and a microcontroller circuit 130. The microcontroller circuit 130 communicates with an isolated drive circuit 140. Also, FIG. 2 shows that the microcontroller chip of circuit 130 may include an integrated communication circuit comprising a simple two-wire asynchronous serial communication interface (SCI) for communicating with an upstream microprocessor (not shown).

FIG. 2A illustrates an isolated analog amplifier circuit, according to an exemplary embodiment, which has two stages formed by the full-wave rectification and amplification circuit 110 and the analog isolation circuit 120, respectively. As shown in FIG. 2A, the full-wave rectification and amplification circuit 110 may be constructed from two op-amps (OpAmp1 and OpAmp2), two diodes, two capacitors (C1 and C2), and four resistors (R1-R4). The output of the full-wave rectification and amplification circuit 110 is a full-wave rectified signal, to be fed into the second stage, the analog isolation circuit 120.

In the analog isolation circuit 120, isolation is performed by an analog opto-isolator. According to an exemplary embodiment, a high-performance HCNR201 analog opto-isolator may be used. As shown in FIG. 2A, the remainder of the analog isolation circuit 129 may be composed of two op-amps (OpAmp3 and OpAmp4), four capacitors (C3-C6), and three resistors (R5-R7). The output of the analog isolation circuit 120 is intended to be an isolated, amplified, and rectified signal that fully represents the instantaneous current waveform. This signal is then fed into one of the analog inputs of the microcontroller (in microcontroller circuit 130).

An exemplary embodiment of the microcontroller circuit 130 is shown in FIG. 2B. This circuit 130 includes an analog interface 1310 and the microcontroller 1320 (e.g., PIC16F873A), as well as a reset circuit (RC circuit connected to pin 1 of the microcontroller 1320) and crystal circuit (crystal Y1 and two capacitors C7-C8 connected to pins 9 and 10 of the microcontroller 1320). Specifically, the reset circuit and crystal circuit used for proper operation of the microcontroller 1320.

Furthermore, as described above, the microcontroller 1320 includes an integrated SC1 communication circuit. As shown in FIG. 2B, the communication circuit transmits and receives signals via pins 17 and 18, respectively.

The operation of the microcontroller circuit 130 in FIG. 2B is as follows. After powering up, the microcontroller 1320 may perform serial communication (via pins 17 and 18) in order to receive commands from, and report status to, the upstream microprocessor (not shown). The analog interface 1310 is used for sampling the current $I_{IN}$ according to a sampling frequency, which may be defined in the software.

The microcontroller 1320 utilizes the functionality of two analog comparators (not shown). One of these analog comparators receives the input temperature signal RTD (pin 3), e.g., via a negative time coefficient (NTC) resistor (not shown), and compares the RTD signal with a first reference $V_{REF1}$ (pin 4) to determine a high-temperature trip. In the example utilizing an NTC resistor, the RTD signal input to pin 3 of FIG. 2B decreases as the temperature increases. Thus, the high-temperature trip occurs when RTD≦$V_{REF1}$.

The other analog comparator in microcontroller 1320 compares the current signal $I_{IN}$ (pin 4) with a second reference ($V_{REF2}$) to determine a short circuit trip. A change in output of either comparator initiates an interrupt, so that the microcontroller 1320 can respond to the corresponding trip with minimal time. A digital output signal (pin 14) may be sent from the microcontroller 1320 to control the isolated drive circuit 140.

An exemplary embodiment of the isolated drive circuit 140 is also shown in FIG. 2B. This circuit may include a gate drive optocoupler (e.g., a HCPL3100 optocoupler). Since a push-pull circuit is integrated into the optocoupler, drive capability is guaranteed. As shown in FIG. 2B, the isolated drive circuit 140 may further be composed of a capacitor (C11) and resistor (R14). Thus, based on the control of the microcontroller 1320, the isolated drive circuit 140 generates an appropriate drive signal DRV to drive the corresponding power switch (not shown).

Software Design

For an embodiment utilizing the software-based implementation, Equation (5) may be modified to simplify the calculation. Specifically, by multiplying both sides by k2, and making the following substitution Q=$k_2$×ΔT, the following equation is obtained:

$$\frac{d}{dt}Q = -\frac{1}{k_1}Q + i(t)^2 \qquad \text{Eq. (9)}$$

Also, instead of using the criterion of ΔT≧$ΔT_s$, use Q≧$Q_s$ as the actual criterion. $Q_s$ is calculated and given from the upstream microprocessor. This way, the burden of the local controller is reduced.

If the sampling frequency is fixed, then by using the sample period as the time unit, Equation (7) can be further simplified to $$dQ = -\frac{1}{k_1}Q + i(t)^2$$

Thus, the new value of Q can be calculated as $$Q_{(n)} = Q_{(n-1)} - \frac{1}{k_1}Q_{(n-1)} + i^2_{(n)} \qquad \text{Eq. (10)}$$

where $i_{(n)}$ is the instantaneous current measured at the $n^{th}$ sampling cycle. Thus, the calculations for Equation (10) are quite simple, involving only one multiplication, one division, and two summations.

Figure 3:
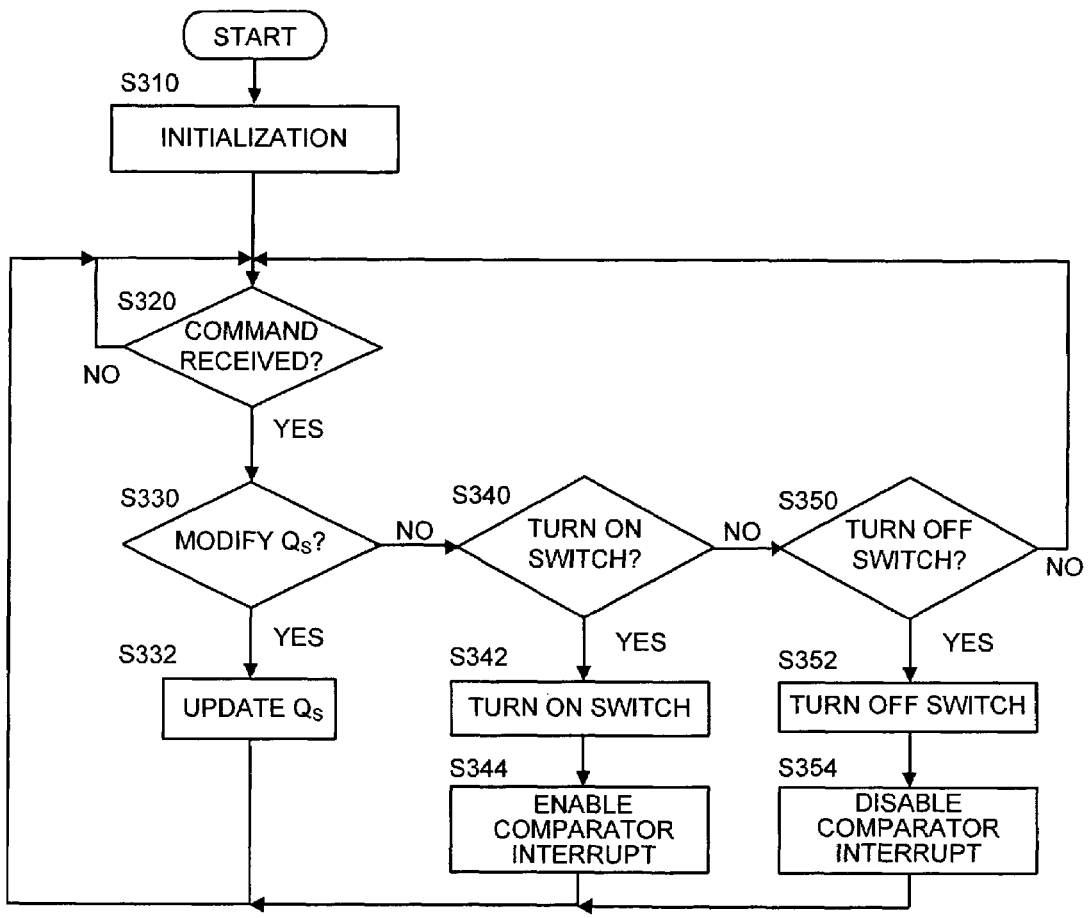
FIGS. 3-5 are flow diagrams illustrating steps for applying virtual ΔT trip criterion in accordance with an embodiment of the present invention.
Figure 4:
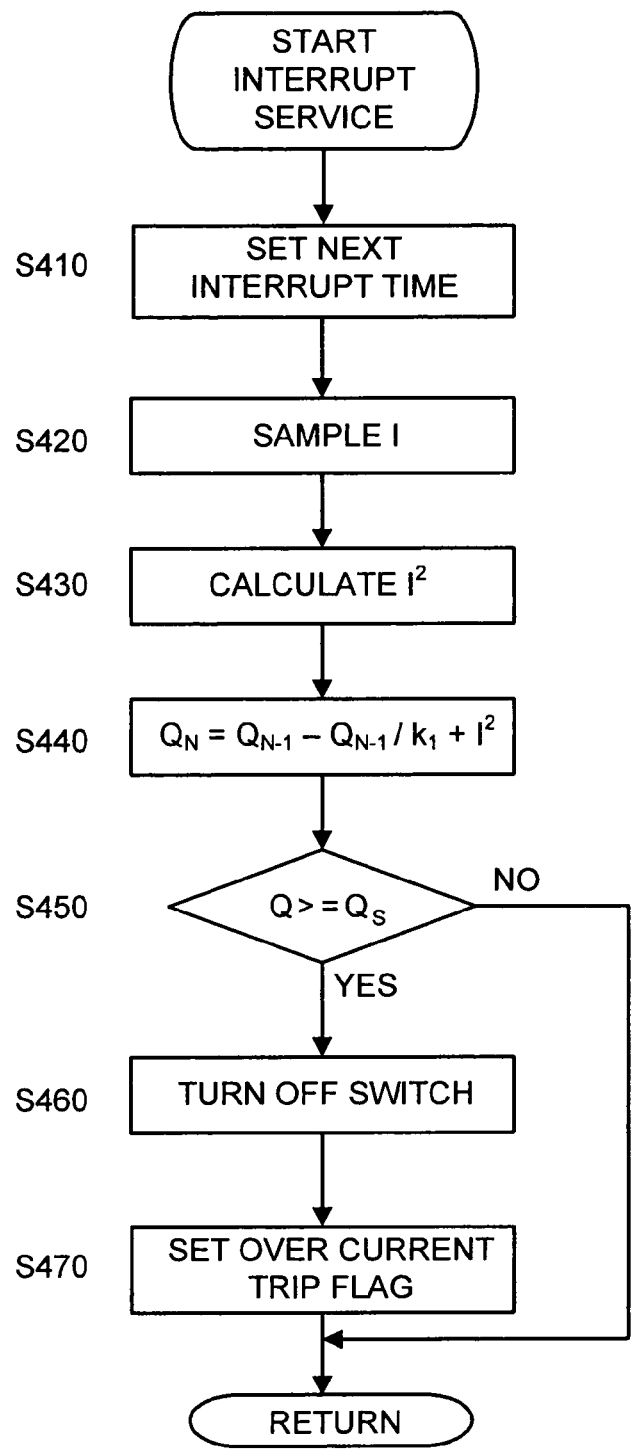
Figure 5:
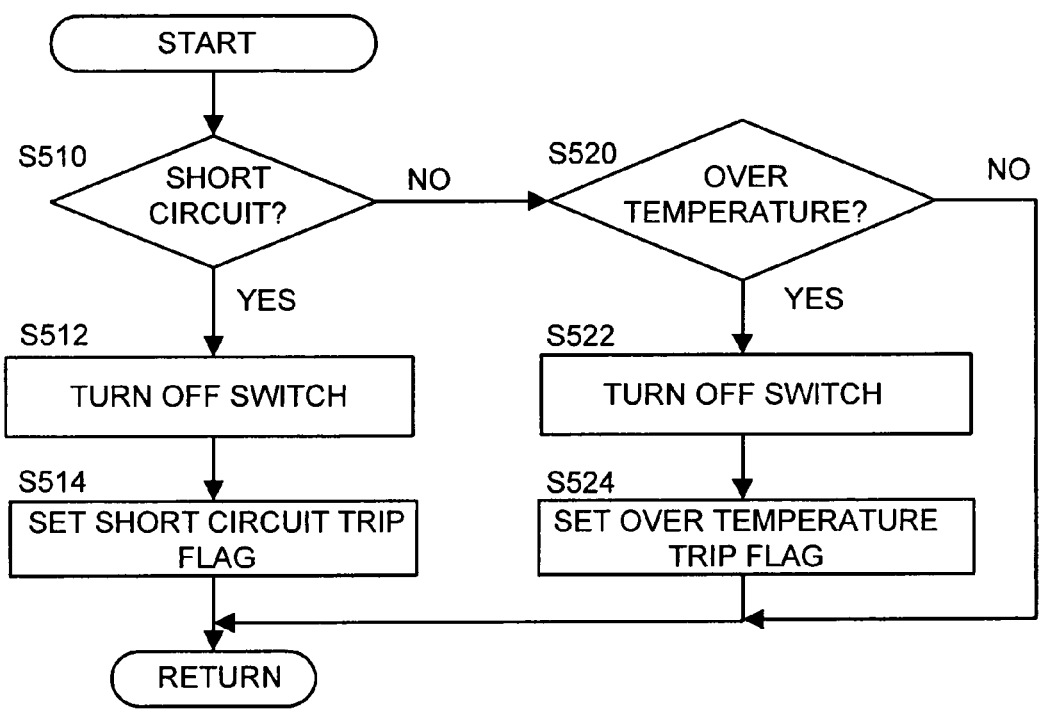

FIGS. 3-5 are flowcharts illustrating exemplary software steps for implementing the virtual ΔT trip criterion in accordance with the software-based embodiment.

FIG. 3 illustrates a main process for the microcontroller 1320 according to an exemplary embodiment. In FIG. 3, initialization is performed for the microcontroller 1320 (S310). After initialization, application of the virtual ΔT trip criterion may occur as an interrupt service performed at particular intervals. For instance, the virtual ΔT trip interrupt service may be performed at fixed intervals. Otherwise, the microcontroller 1320 may receive commands from an upstream processor (S320). Such commands may include modifying the virtual ΔT trip threshold $Q_s$ (S330-32), modifying other trip thresholds, or otherwise reconfiguring operation of the microcontroller 1320. Also, the microcontroller 1320 may receive express commands for the SSPC to turn the corresponding power switch on or off (S340-54).

FIG. 4 is a flowchart illustrating the process employed by the interrupt service discussed above for applying the virtual ΔT trip criterion, according to an exemplary embodiment. The process might include setting a next interrupt time, i.e., sample time n, (S410), e.g., according to preset fixed intervals or some other criteria. Next, the interrupt service may sample the instantaneous current i(n) (S420), obtain $i_{(n)}^2$ (S430), and apply it to the virtual ΔT model, i.e., Equation 10 (S440). If the trip criterion is satisfied Q≧$Q_s$ (i.e., $I_{IN}$≧$V_{REF2}$ in FIG. 2B), the microcontroller 1320 turns off the power switch (S3450-60). An over-current trip flag may be set (S470) to notify other components (upstream processor, etc) when a virtual ΔT trip occurs.

Of course, the microcontroller 1320 may further be configured to implement other protective trips. These may include an over-temperature trip and/or a short circuit trip. FIG. 5 is a flowchart illustrating the implementation of these trips in the SSPC microprocessor 1320 according to an exemplary embodiment. In FIG. 5, if a short circuit is detected (S510), the power switch is turned off (S512) and a short circuit trip flag may be set (S514) in the microprocessor 1320. Similarly, if the temperature is too high (S520), the power switch is turned off (S522) and an over-temperature trip flag may be set (S524) in the microprocessor 1320.

Implementation of Hardware Approach for an SSPC Unit

As discussed above, the thermal process can be represented using the circuit in FIG. 1. Since it is easier to implement a voltage source than current source, it is sometimes advantageous to transform the R-C circuit of FIG. 1 into an equivalent form 2210 with voltage signal $V_{IN}$ as the input, as shown in FIG. 6. In an embodiment utilizing the R-C circuit 2210 of FIG. 6, $V_{in}$ may be set proportional to the square of the instantaneous current $i^2(t)$ in the wire to be protected, and $V_{OUT}$ may be set proportional to the temperature rise ΔT of the wire.

Figure 7:
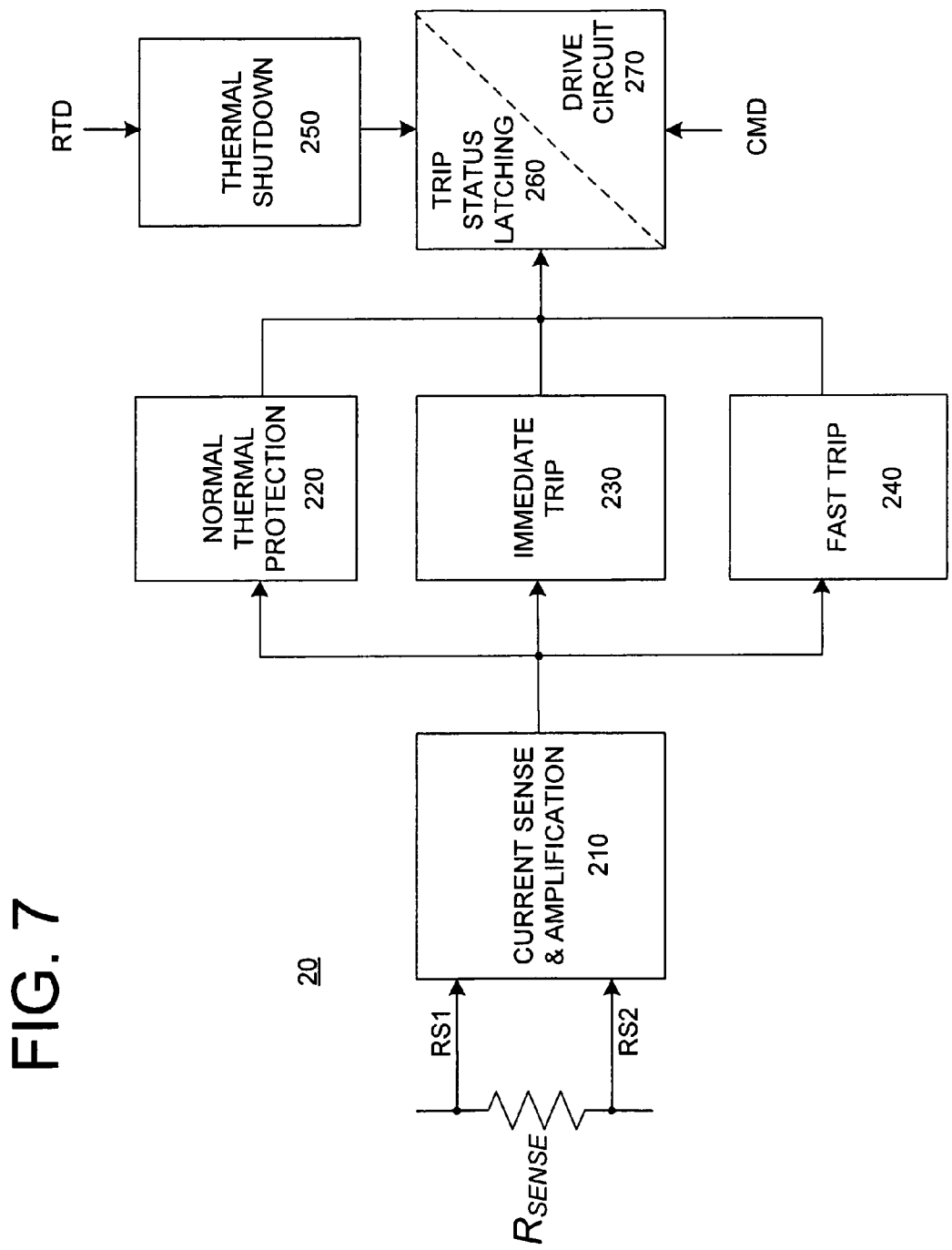

FIG. 7 is a block diagram of a SSPC unit 20 utilizing a hardware implementation of the virtual ΔT trip criterion, while FIGS. 7A-7E are schematics illustrating components thereof, in accordance with an embodiment of the present invention.

As shown in FIG. 7, the SSPC unit 20 includes a current sense and amplification circuit 210, which senses the input current through a sense resistor $R_{SENSE}$ connected to inputs RS1 and RS2. The current sense and amplification circuit 210 is connected to a normal thermal protection circuit 220, immediate trip circuit 230, and fast trip circuit 240. In FIG. 7, circuits 220, 230, and 240 are further connected to the trip status latching circuit 260 and gate drive circuit 270. Also, the SSPC unit 20 includes a thermal shutdown circuit 250, which receives a temperature signal RTD, and is connected to the trip status latching circuit 260 and gate drive circuit 270. The operation of the various components of the SSPC unit 20 is described in more detail below.

Figure 7A:
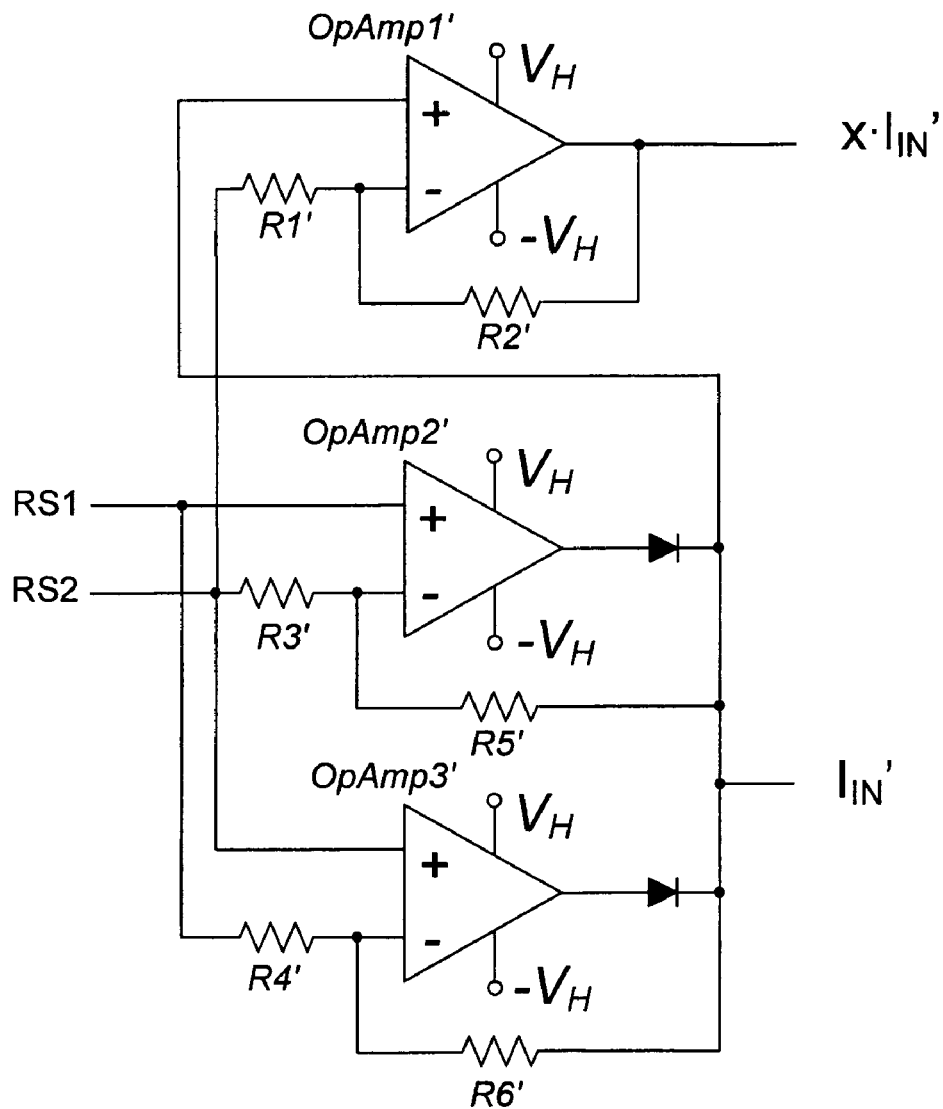
FIGS. 7A-7E are schematics illustrating components thereof, in accordance with an embodiment of the present invention.

FIG. 7A illustrates a schematic diagram of the current sense and amplification circuit 210, according to an exemplary embodiment. As mentioned above, the current signal is sensed through a sense resistor $R_{SENSE}$. Specifically, the voltage across the sense resistor is fed to RS1 and RS2. The first stage is a full-wave rectifier circuit comprised of op-amps Op-Amp 2 and Op-Amp3' and resistors R3'-R6'. The output of this stage $I_{IN}'$ is the absolute value of some multiple (e.g., 4 times) of the input voltage. This output $I_{IN}'$ may be sent to the immediate trip circuit 230 and fast trip circuit 240. It also serves as the input of the second stage of the amplifier, which is comprised of OpAmp1' and resistors R1' and R2'. The second stage amplifies the signal by another factor x. For instance, the second stage may amplify the signal $I_{IN}'$ by another 5 times (x=5). The output of the second stage $x \cdot I_{IN}'$ is used in the normal thermal protection circuit 220.

Figure 7B:
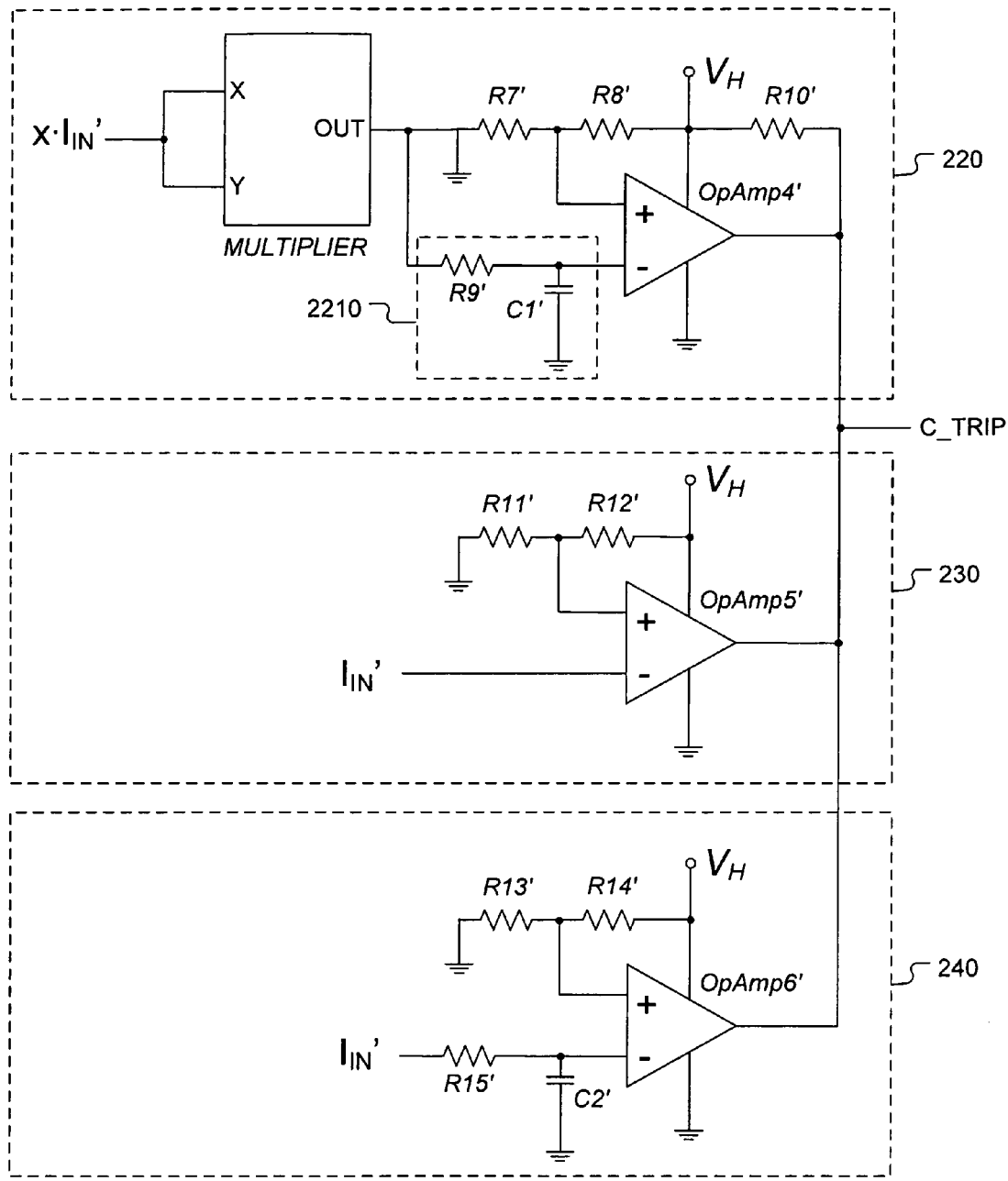

FIG. 7B illustrates schematic diagrams of the normal thermal protection circuit 220, the intermediate trip circuit 230, and the fast trip circuit 240.

The normal thermal protection circuit 220 is the part that implements the equivalent R-C circuit 2210, i.e., the hardware implementation of the virtual ΔT trip criterion. Referring to FIG. 7B, the first part of the normal thermal protection circuit 220 is an analog multiplier for calculating the square of the output signal $x \cdot I_{IN}'$ from the current sense and amplification circuit 210. Thus, the output of the analog multiplier is proportional to the square of the wire current. The R-C circuit 2210 (components R9' and C1') converts this signal into a voltage that is proportional to the temperature rise ΔT of the electrical wire. The output is compared with a preset threshold (generated according to resistors R7' and R8') by OpAmp4', to generate the trip signal C_TRIP when necessary.

Referring again to FIG. 7B, the immediate trip circuit is implemented for the protection of the power switching device (not shown) of the SSPC unit 20. OpAmp5' compares the $I_{IN}'$ output by the current sense and amplification circuit 210 with a preset threshold (generated according to resistors R11' and R12'). Based on the comparison, OpAmp5' generates the trip signal C_TRIP if necessary. Similarly, the fast trip circuit 240 is also used for the protection of the switching device only. Another R-C circuit (R15' and C2'), with a smaller time constant than circuit 2210, is used for the protection. The output is compared with a preset fast trip threshold (R17 and R18), to generate the trip signal.

Figure 7C:
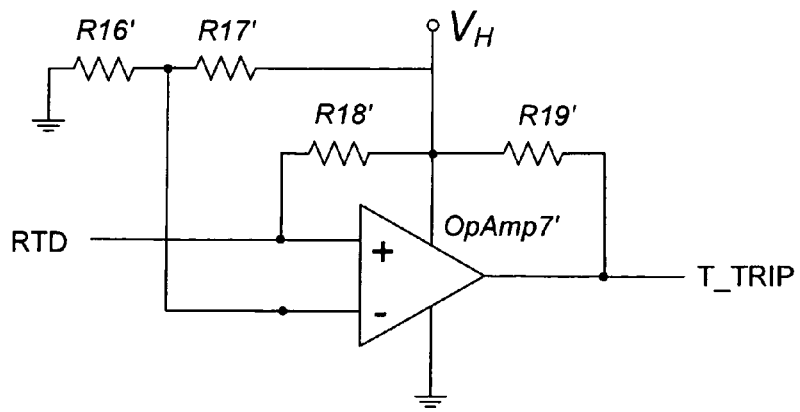

FIG. 7C illustrates a schematic diagram of the thermal shutdown circuit 250, according to an exemplary embodiment. The power switching device (not shown) of the SSPC unit 20 is configured to generate a temperature signal RTD to be input to the thermal shutdown circuit 250, e.g., through a negative time coefficient (NTC) resistor (not shown). Thus, FIG. 7C shows the RTD signal being input to OpAmp7', which is connected to the resistor bridge (comprising R16'-R18'). OpAmp7' compares RTD to the voltage across R16' to generate the thermal trip signal T_TRIP.

Figure 7D:
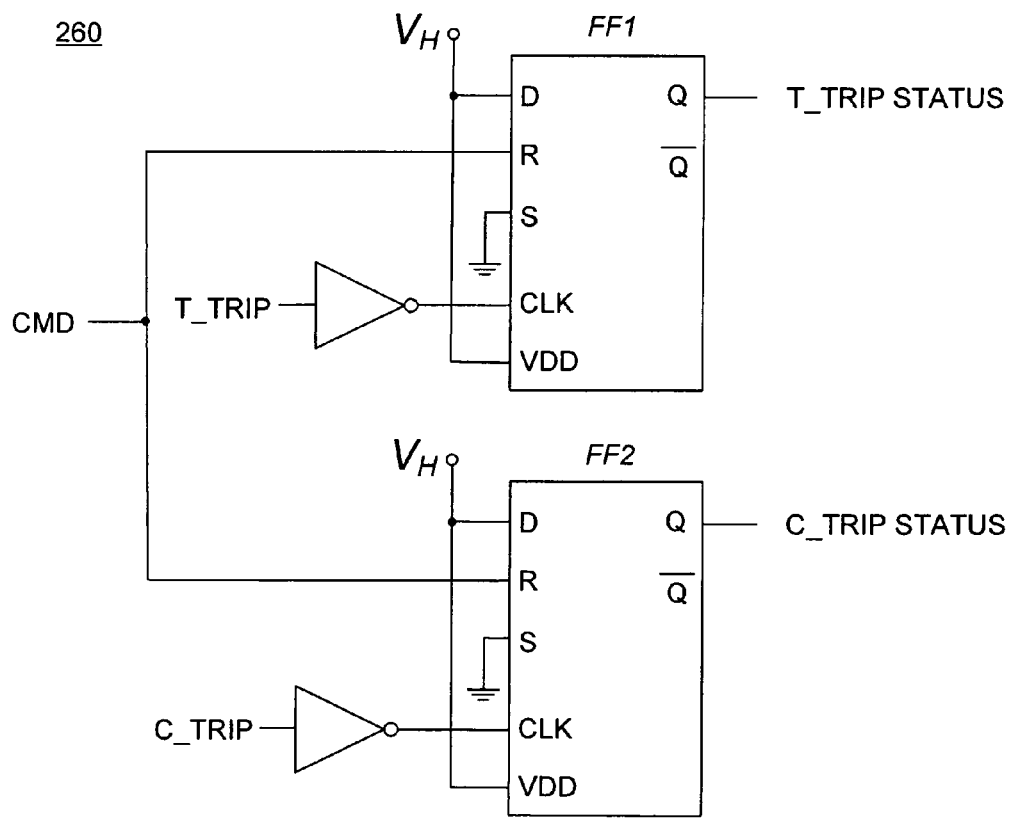

FIG. 7D illustrates a schematic diagram of the trip status latching circuit 260, according to an exemplary embodiment. Once a trip occurs, no matter whether it is a thermal trip or current-based trip, the corresponding trip signal (T_TRIP or C_TRIP) should be latched until the command signal CMD is set to turn off the power switching device (not shown). As shown in FIG. 7D, the trip signal latching may be performed using two D flip-flops (FF1 and FF2).

Figure 7E:
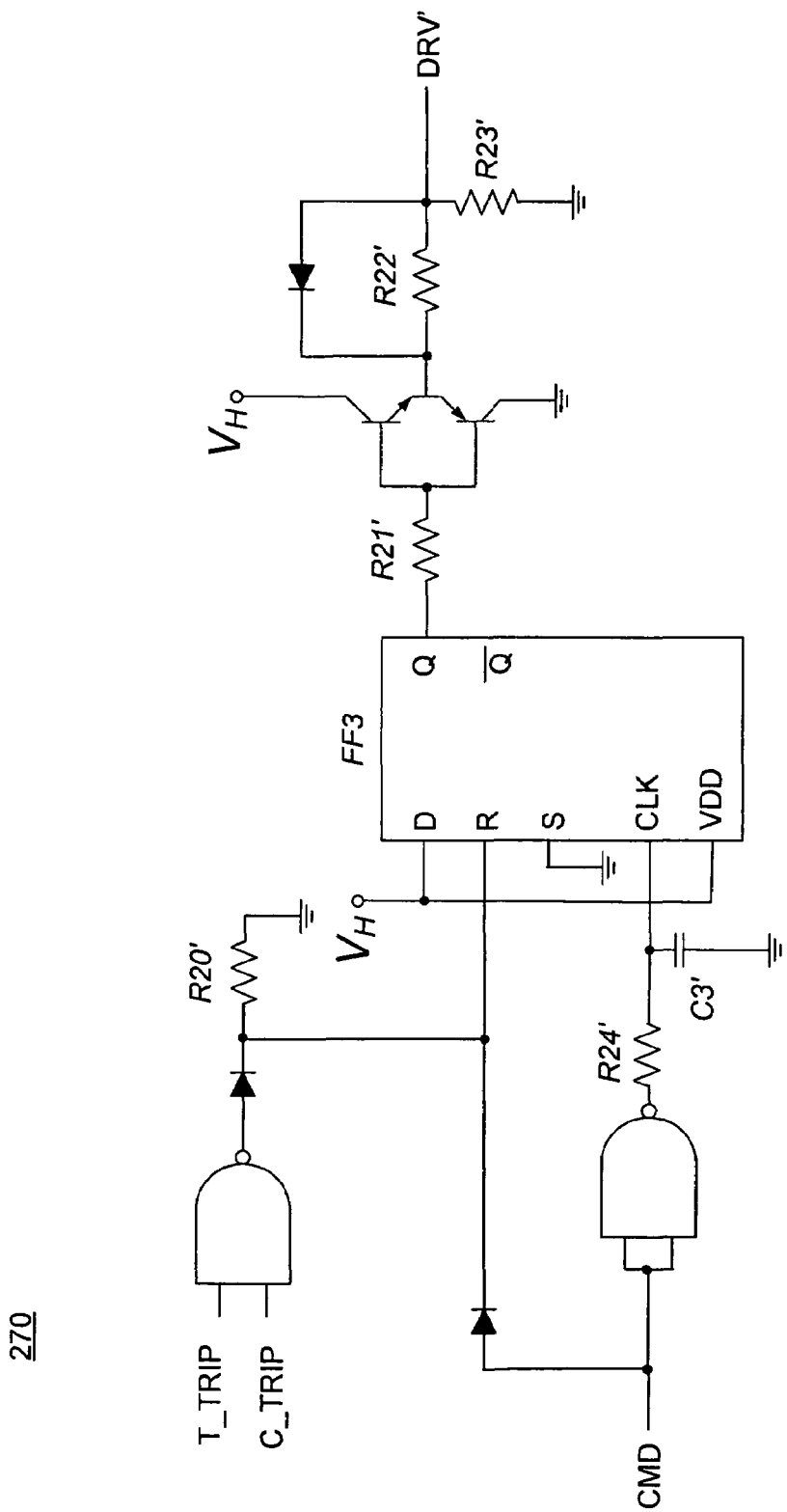

FIG. 7E illustrates a schematic diagram of the gate drive circuit 270 for the power switching device (not shown). The command signal CMD is used for turning on and off the power switching device, i.e., by virtue of the on/off status of CMD. In other words, the CMD signal is on when the power switching device is to be turned on, and CMD is off when the power switching device is to be turned off. However, according to the operation of gate drive circuit 270, once a trip occurs (thermal or current-based), the command signal CMD has to go off and back on again to turn on the switch again. The latching of the gate signal is implemented by a D flip-flop (FF3). The gate signal is driven with a totem-pole circuit.

While exemplary embodiments described hereinabove, it should be recognized that these embodiments are provided for illustration and are not intended to be limitative. Any modifications and variations, which do not depart from the spirit and scope of the invention, are intended to be covered herein.

What is claimed is:

1. An apparatus for controlling electrical power distribution in an enclosed environment, the apparatus being configured to:
    use a solid state power switch to apply power to an insulated electric wire;
    measure current passing through the electric wire;
    apply the measured current to a first-order system model of the electric wire in order to obtain a simulated parameter, wherein the simulated parameter represents a temperature change in the electric wire;
    compare the simulated parameter to a threshold; and
    use the solid state power switch to turn off power to the electric circuit when the simulated parameter exceeds the threshold,
    wherein the first-order system model is derived according to the physical dimensions and electrical properties of the electric wire and has a fixed parameter representing a cooling rate of the electrical wire and a fixed parameter representing a rate of temperature increase for the electric wire, the primary mode of heat transfer from the electrical wire being conduction.

2. The apparatus of claim 1, further comprising an ambient temperature sensor, wherein the simulated parameter is combined with an output of the temperature sensor to represent the temperature in the electric wire.

3. The apparatus of claim 1, wherein the simulated parameter represents the temperature change in the electric wire, and the first-order system model is configured so that the temperature change is simulated according to the following equation:

$$\frac{d}{dt} = \Delta T = -\frac{1}{k_1}\Delta T + \frac{1}{k_2}i(t)^2,$$

where
    $i(t)$ is a measurement of instantaneous current;
    ΔT is the simulated temperature change,
    $k_1$ is a fixed parameter representing a cooling rate for the electric wire, and
    $k_2$ is a fixed parameter representing a rate of temperature increase for the electric wire, $k_2$ being derived from the physical dimensions and electrical properties of the electric wire.

4. The apparatus of claim 3, wherein the first-order system model is configured such that $$k_2 = \frac{c\rho_m \pi^2 r^4}{\rho_r}, \text{ where}$$

c is a specific heat of the electric wire,
$P_m$ is a density of the electric wire,
r is a radius of the electric wire, and
$P_r$ is a resistivity of the electric wire.

5. The apparatus of claim 3, wherein the first-order system model is configured such that $$k_1 = \frac{c\rho_m rD'}{2k}, \text{ where}$$

D' is a thickness or compensated thickness of insulation material of the electric wire, and
k is a thermal conductivity of an insulation of the electric wire.

6. The apparatus of claim 5, wherein D' is a measured thickness of the insulation material of the electric wire.

7. The apparatus of claim 3, wherein $k_2$ is derived theoretically based on the physical dimensions and electrical properties of the electric wire, and $k_1$ is derived, at least in part, by experimentation.

8. The apparatus of claim 3, wherein $k_1$ is derived theoretically based on the physical dimensions and electrical properties of the electric wire, and $k_2$ is derived, at least in part, by experimentation.

9. The apparatus of claim 1, the apparatus comprising:
a microcontroller operable to calculate the simulated parameter based on a squared value of the measured current.

10. The apparatus of claim 8, wherein the microcontroller calculates the simulated parameter according to the following equation:

$$Q_n = Q_{n-1} - \frac{1}{k_1}Q_{n-1} + i(t)^2$$

where i(t) is a measurement of instantaneous current;
$Q_n$ is a value of the simulated parameter for a present sampling time of the instantaneous current,
$Q_{n-1}$ is a value of the simulated parameter obtained for the previous sampling time of the instantaneous current,
$k_1$ is a fixed parameter associated with a cooling rate for the electric wire.

11. The apparatus of claim 8, wherein the microcontroller is further operable to compare the simulated parameter to a threshold for each sampling time of the measured current, and turn off the solid state power switch when the simulated parameter exceeds the threshold.

12. The apparatus of claim 1, wherein the apparatus comprises a resistor-capacitor (RC) circuit for implementing the first-order system model, the RC circuit including:
a resistor having one end connected to an input terminal of the RC circuit and the end connected to an output terminal of the RC circuit; and
a capacitor having one end connected to the output terminal of the RC circuit and the other end connected to ground, such that the RC circuit outputs the voltage across the capacitor.

13. The apparatus of claim 12, further comprising:
a circuit configured to sense and amplify instantaneous current from the electric circuit;
a multiplier device adapted to receive the amplified current and output a voltage signal representing the squared value of the amplified current;
a circuit adapted to apply the squared-value voltage signal to the input terminal of the RC circuit, and
a comparator for comparing the output of the RC circuit to a reference signal representing the threshold for turning off power to the electric circuit.

* * * * *